United States Patent [19]

Foster

[11] Patent Number: 5,165,524

[45] Date of Patent: Nov. 24, 1992

[54] RECIPROCATING FLOOR CONVEYOR

[76] Inventor: Raymond K. Foster, P.O. Box 1, Madras, Oreg. 97741

[21] Appl. No.: 831,451

[22] Filed: Feb. 5, 1992

[51] Int. Cl.$^5$ .......................................... B65G 25/00
[52] U.S. Cl. ................................. 198/750; 414/525.1
[58] Field of Search ...................... 198/750; 414/525.1, 414/525.9

[56] References Cited

U.S. PATENT DOCUMENTS

| | | | |
|---|---|---|---|
| 4,492,303 | 1/1985 | Foster | 198/750 |
| 4,748,893 | 6/1988 | Foster | 91/176 |
| 4,785,929 | 11/1988 | Foster | 198/750 |
| 4,793,469 | 12/1988 | Foster | 198/750 |
| 4,817,783 | 4/1989 | Foster | 198/750 |
| 4,969,387 | 11/1990 | Foster | 91/176 |
| 4,969,389 | 11/1990 | Foster | 92/66 |
| 5,000,647 | 3/1991 | Foster | 198/750 |
| 5,096,356 | 3/1992 | Foster | 414/525.1 |

Primary Examiner—Joseph E. Valenza
Attorney, Agent, or Firm—Delbert J. Barnard; Glenn D. Bellamy

[57] ABSTRACT

A lightweight reciprocating floor conveyor characterized by a plurality of elongated floor members which are divided into sets and groups. Each set comprises at least two floor members in a common order and each group comprises one member from each set. The groups extend side-by-side across the conveyor. The floor members are supported on a conveyor frame, each for longitudinal back and forth movement, and a drive mechanism is provided for the floor members. Separate linear hydraulic drive motors are provided for each set of floor members. Each drive motor has a stationary portion and a movable portion, the stationary portion being connected to a stationary frame member and the movable portion being connected to a floor member of its set. A plurality of transverse drive beams are provided, one for each set of floor members. The drive beams are spaced longitudinally of the conveyor from the motors. All of the floor members of each set are connected to the drive beam for the set. Operation of each drive motor exerts a drive force onto a particular floor member to which the drive motor is connected. This floor member will function as a longitudinal drive beam and will transmit the drive force to the tranverse drive beam. Each transverse drive beam will in turn transmit the drive forces to other floor members of its set.

15 Claims, 12 Drawing Sheets

Fig.32 ic Field
This invention relates to the provision of a new
RECIPROCATING FLOOR CONVEYOR

DESCRIPTION

1. Technical Field

This invention relates to the provision of a new unique reciprocating floor conveyor. More particularly, it relates to the provision of a reduced weight conveyor, powered by linear hydraulic motors, in which the thrust lines of the motors are positioned closely adjacent the center of gravity of the conveyor slat members.

2. Related Application

This application is filed substantially concurrently with my companion application Ser. No. 831173, filed and entitled "System of Linear Hydraulic Motor". The contents of that application are hereby incorporated by reference into this application.

BACKGROUND OF THE INVENTION

My U.S. Pat. No. 4,492,303, granted Jan. 8, 1985, discloses an early form of drive mechanism for a reciprocating floor conveyor. The system included extensible linear hydraulic motors connected at their cylinder ends to a frame structure and at their piston ends to push rods. The push rods were supported and guided at two locations by bearings. Between these locations the drive rods were connected to an equal number of transverse drive beams. The floor slat members were connected to the drive beams. This type of system required substantial bracing structure for the push rods, making the drive mechanism large and heavy.

The drive mechanism disclosed in my U.S. Pat. No. 4,793,469, granted Dec. 27, 1988, was designed to reduce the size and weight of the drive mechanism. In the system disclosed by this patent, the push rods were eliminated. The drive beams were directly connected to movable central portions of the linear hydraulic motors. Fixed opposite end portions of the motors were connected to transverse frame members which were in turn connected to frame portions of an installation. The invention of this patent was incorporated into the drive mechanism disclosed in my U.S. Pat. No. 4,748,893, granted Jun. 7, 1988. Thereafter, in an effort to further minimize the size and weight of the drive mechanism, I made the inventions which are disclosed in my U.S. Pat. No. 4,817,783, granted Apr. 4, 1989, my U.S. Pat. No. 4,969,387, granted Nov. 13, 1990, and in my U.S. Pat. No. 4,969,389, granted Nov. 13, 1990.

In each of the prior art systems described in the preceding paragraph there is a connection between the transverse drive beams, to which the floor members are attached, and the moving component of the linear hydraulic motor. Of necessity, the movable portion of the linear hydraulic motor had to be located below the transverse drive beams. This moved the centers of thrust of the motors away from the center of gravity of the floor members and made it necessary to utilize relatively heavy drive beams and substantial connections between the drive beams and the motors.

A principal object of the present invention is to provide a reciprocating floor conveyor in which the thrust lines of the linear hydraulic motors are raised, into positions closely adjacent the center of gravity of the floor members, and the size and weight of many of the conveyor components, including the transverse drive beams, are reduced.

DISCLOSURE OF THE INVENTION

The present invention provides a reciprocating floor conveyor having a lightweight conveyor frame and drive system which closely aligns the longitudinal thrust lines of the drive motors to the longitudinal center of gravity of the floor members. The reciprocating floor conveyor of the present invention is characterized by a plurality of elongated floor members which are divided into sets and groups. Each set comprises at least two floor members in a common order and each group comprises one member from each set. The groups extend side-by-side across the conveyor. The floor members are supported on a conveyor frame, each for longitudinal back and forth movement, and a drive mechanism is provided for the floor members. The present invention comprises a separate linear hydraulic drive motor for each set of floor members. Each drive motor comprises a stationary portion and a movable portion, the stationary portion being connected to a stationary frame member and the movable portion being connected to a floor member of its set. A plurality of transverse drive beams are provided, one for each set of floor members. The drive beams are spaced longitudinally of the conveyor from the motor. All of the floor members of each set are connected to the drive beam for the set. Operation of each drive motor exerts a drive force onto a particular floor member to which the drive motor is connected. This floor member will function as a longitudinal drive beam and will transmit the drive force to the transverse drive beam. Each transverse beam will in turn transmit the drive forces to other floor members of its set.

The floor members may be constructed substantially in the form of a channel having a top portion and downwardly-extending side portions defining a space below the top portion and between the side portions. Each linear hydraulic drive motor may be positioned adjacent to and below a floor member of its set and may be positioned at least partially within the space defined by the floor member. In preferred form, it is an object of the present invention to position the longitudinal axis of each drive motor closely adjacent the longitudinal center of gravity of the floor member to which it is connected.

The connection between the stationary portion of each motor and the stationary frame member may include a ball and socket. This ball and socket connection may include integral hydraulic fluid conduit connections therebetween with mating ports. The connection may also include a separable portion which when in place retains the ball within the socket and when separated allows lateral removal of the ball from the socket. A bearing member may be provided on the stationary connection to carry vertical loads of the floor member positioned thereabove.

Longitudinal load bearing guide beams may be positioned in line with each of the linear hydraulic drive motors and extend to an end member of the conveyor frame for transfer of longitudinal thrust loads thereto.

The connection between the movable portion of each drive motor and the floor member to which it is connected may include a pin and socket connection. The socket includes an annular groove and the pin includes an associated annular ridge for carrying of longitudinal loads therebetween. The socket may include a separable portion which when in place restrains the pin in the socket and when separated allows lateral removal of the pin from the socket. The connection may also include a longitudinally extended attachment portion to further facilitate attachment of the movable portion of each drive motor to a floor member along an axial thrust line which is closely adjacent to a longitudinal center of gravity of the floor member.

The present invention also includes the provision of transverse drive beams having laterally extending frame portions interconnected by a web portion. Connection between the floor members and the transverse drive beam may be directly to either the frame portion or the web portion. Connection may be made in certain instances to the web portion only in order to allow the frame portion to carry moment loads, accommodate torsional loads, and so as not to weaken locations on the lightweight frame portion.

Other features and advantages of the present invention can be seen and understood by examination of the appended drawings, description of the best mode for carrying out the invention and the claims, all of which are incorporated herein by reference as a portion of the disclosure of the present invention.

BRIEF DESCRIPTION OF THE DRAWING

In the drawings, like element designations refer to like parts throughout, and.

BEST MODE FOR CARRYING OUT THE INVENTION

Figure 1:
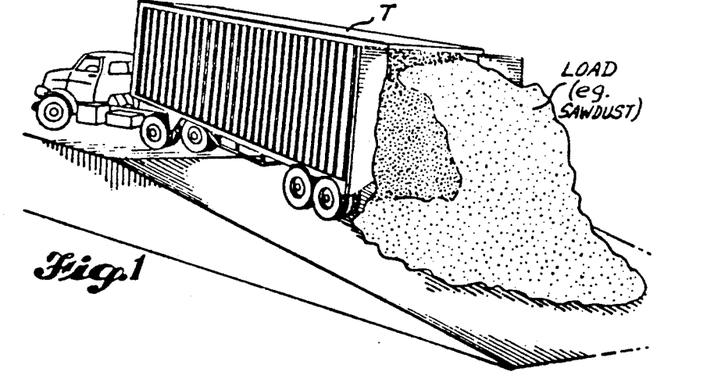
FIG. 1 is a pictorial view of a trailer that is equipped with a reciprocating floor conveyor constructed in accordance with the present invention, such trailer being shown in the process of using the conveyor to unload its load.

FIG. 1 shows a load of sawdust or other bulk material being unloaded from a large truck T by use of a reciprocating floor conveyor within the truck T.

FIGS. 2-6 illustrate how the reciprocating floor conveyor works. These figures show two groups of floor members. Each group comprises three independent floor members of separate sets designated 1, 2 and 3. The members "1" move together. The members "2" move together. And, the members "3" move together.

Figure 2:
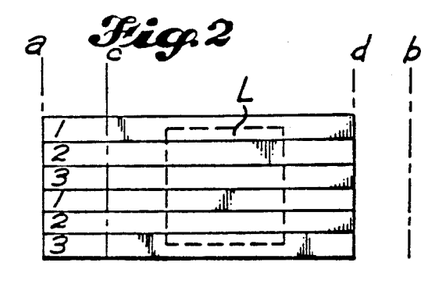
FIG. 2 is a top plan diagram of a conveyor which includes three floor members per group with each common floor member being identified by a common number, such conveyor being shown in a fully retracted position.
Figure 3:
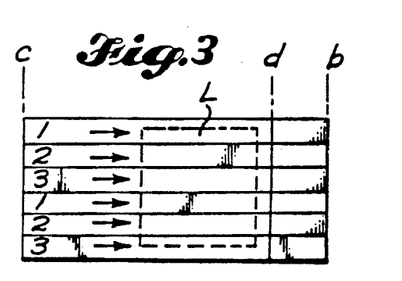
FIG. 3 is a view like FIG. 2, but showing all the floor members being advanced in unison to convey a load in the direction indicated by arrows.
Figure 4:
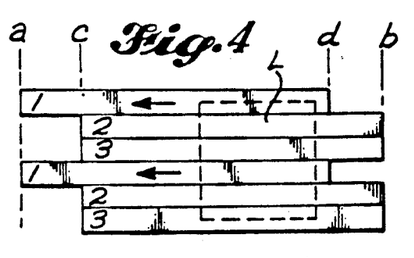
FIG. 4 is a view like FIGS. 2 and 3, showing floor members 2 and 3 stationary while floor members 1 are being retracted.
Figure 5:
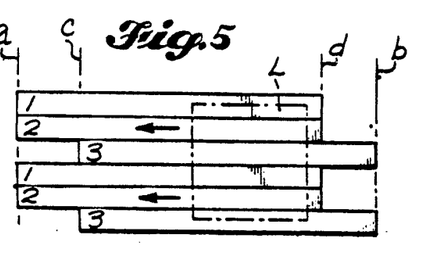
FIG. 5 is a view like FIGS. 2-4, but showing floor members 1 and 3 stationary while floor members 2 are being retracted.
Figure 6:
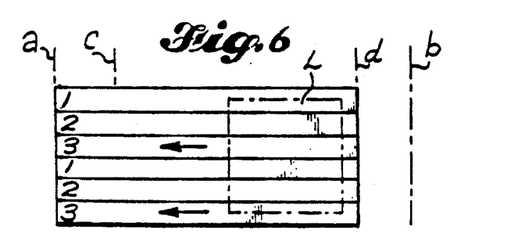
FIG. 6 is a view like FIGS. 2-5, but showing floor members 1 and 2 stationary and floor members 3 being retracted.

FIG. 2 shows all of the floor members in a retracted position in which common ends are lined at a start station a. A load L is shown centrally positioned on the floor. FIG. 3 shows all of the floor members being advanced together to move the load L forwardly and the opposite ends of the floor members to a fully advanced position b. FIG. 4 shows the group "1" floor members being retracted and the groups "2" and "3" floor members held stationary. The load does not move because the frictional forces exerted on it by the stationary floor members are larger than the frictional forces exerted on it by the retracting floor members "1". FIG. 5 shows the next step in the sequence. The retracted floor members "1" and the still advanced floor members "3" are held stationary and the floor members "2" are retracted. Again, the load L does not move. FIG. 6 shows retracted floor members "1" and "2" stationary and floor members "3" being retracted. Again, the load L does not move. In this example the load has moved a distance equal to the endwise movement of the floor, viz. a-c or d-b.

Figure 7A:
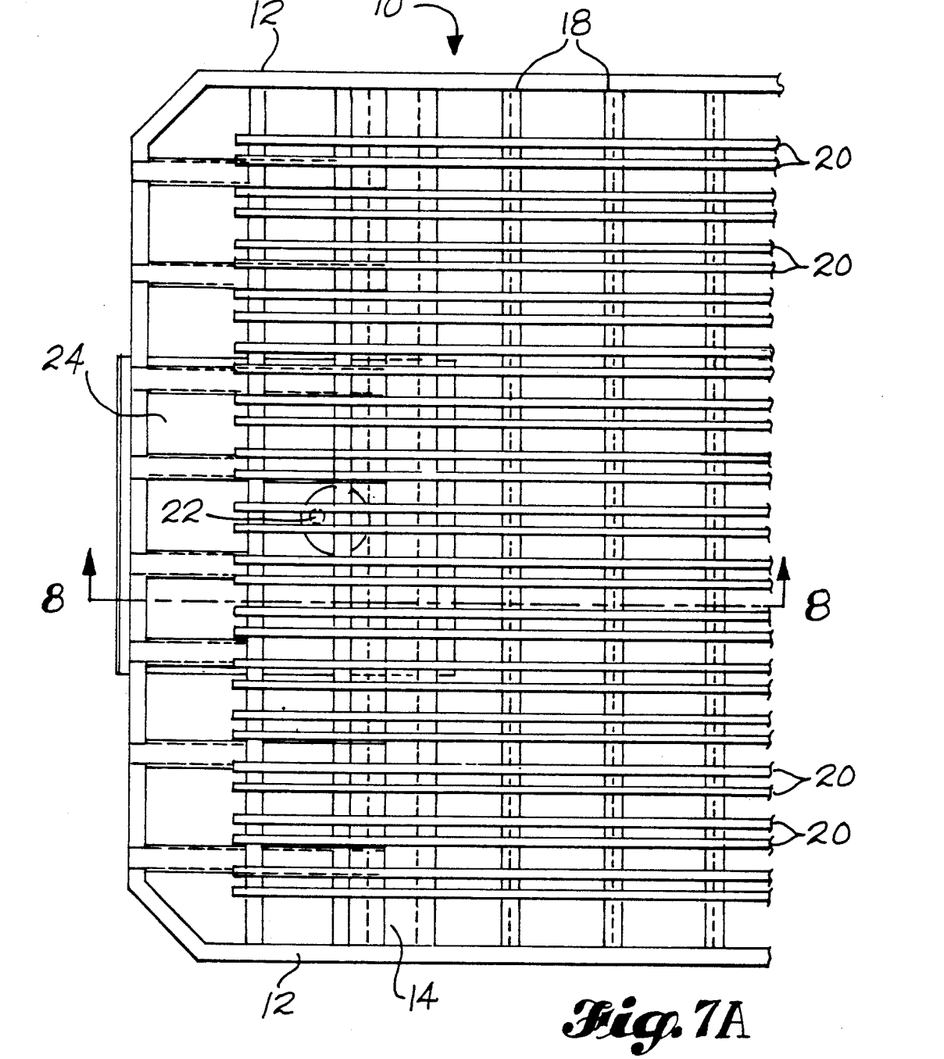
FIGS. 7A, 7B and 7C are sections of a top plan view of the conveyor, with the floor members omitted, such view looking down onto the conveyor frame and the components of the drive mechanism.
Figure 7B:
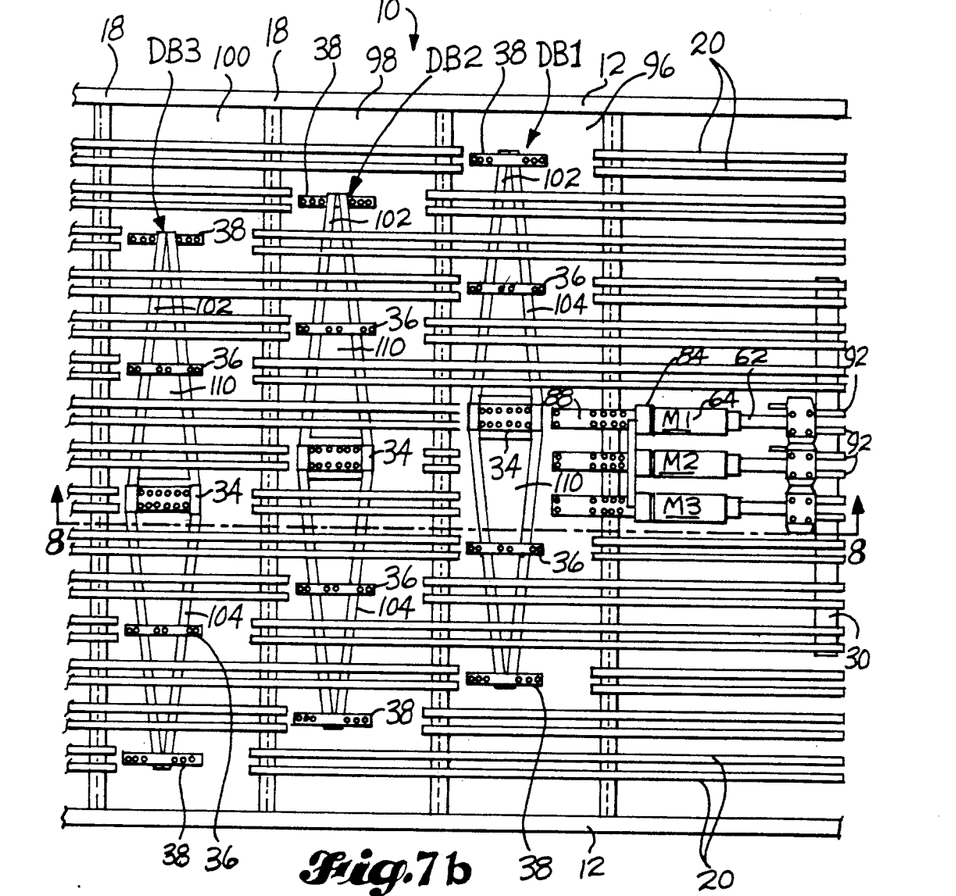
Figure 7C:
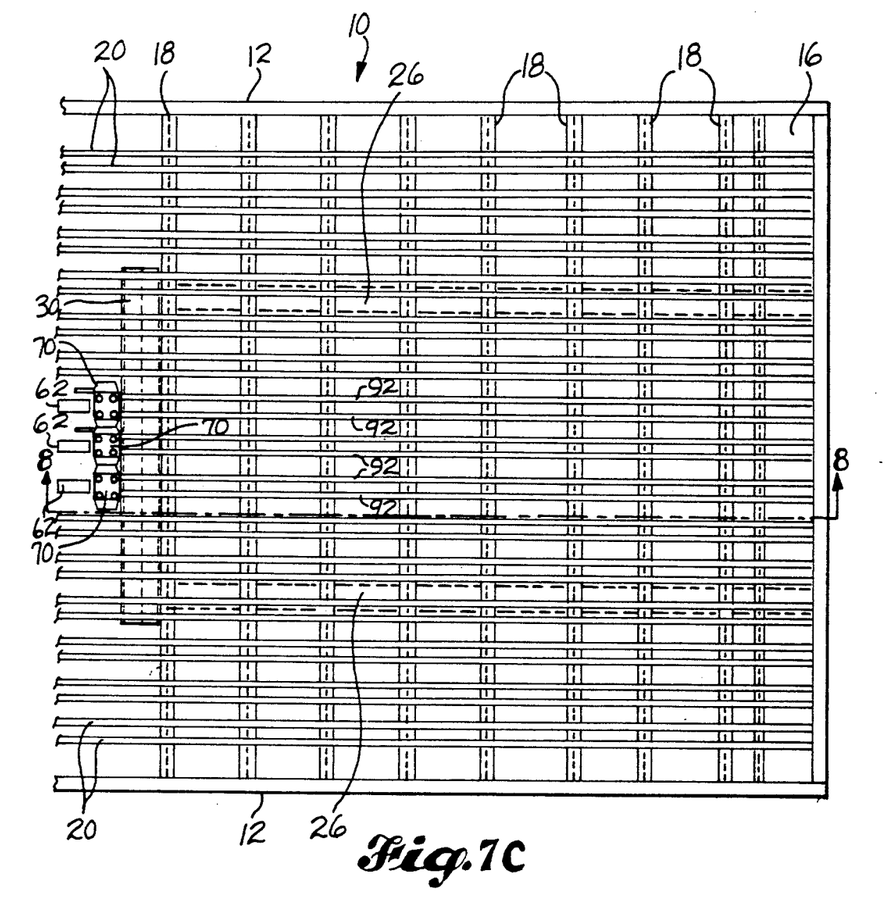

Referring now to FIGS. 7A, 7B and 7C, and also 8A, 8B and 8C, therein is shown the supporting framework and drive means for a reciprocating floor conveyor according to the present invention in a trailer. Floor members are not shown in these figures in order to provide clarity.

The conveyor frame 10 includes first and second longitudinal side beams 12, a transverse forward beam 14, and a transverse rear beam 16. A plurality of transverse beams 18 are interconnected between the side beams 12. Longitudinal guide beams 20 are mounted on the transverse beams 18. At the forward end of the conveyor frame 10 is a king pin 22 and king pin mounting plate 24. The rear end of the conveyor frame 10 is mounted on a substructure frame 26, below the conveyor frame. This substructure 26 is typically part of the rear wheel bogey (not shown) common in trailer construction which does not include a full length main frame. The rear transverse frame member 16 is rigidly connected to the subframe 26.

Figure 9:
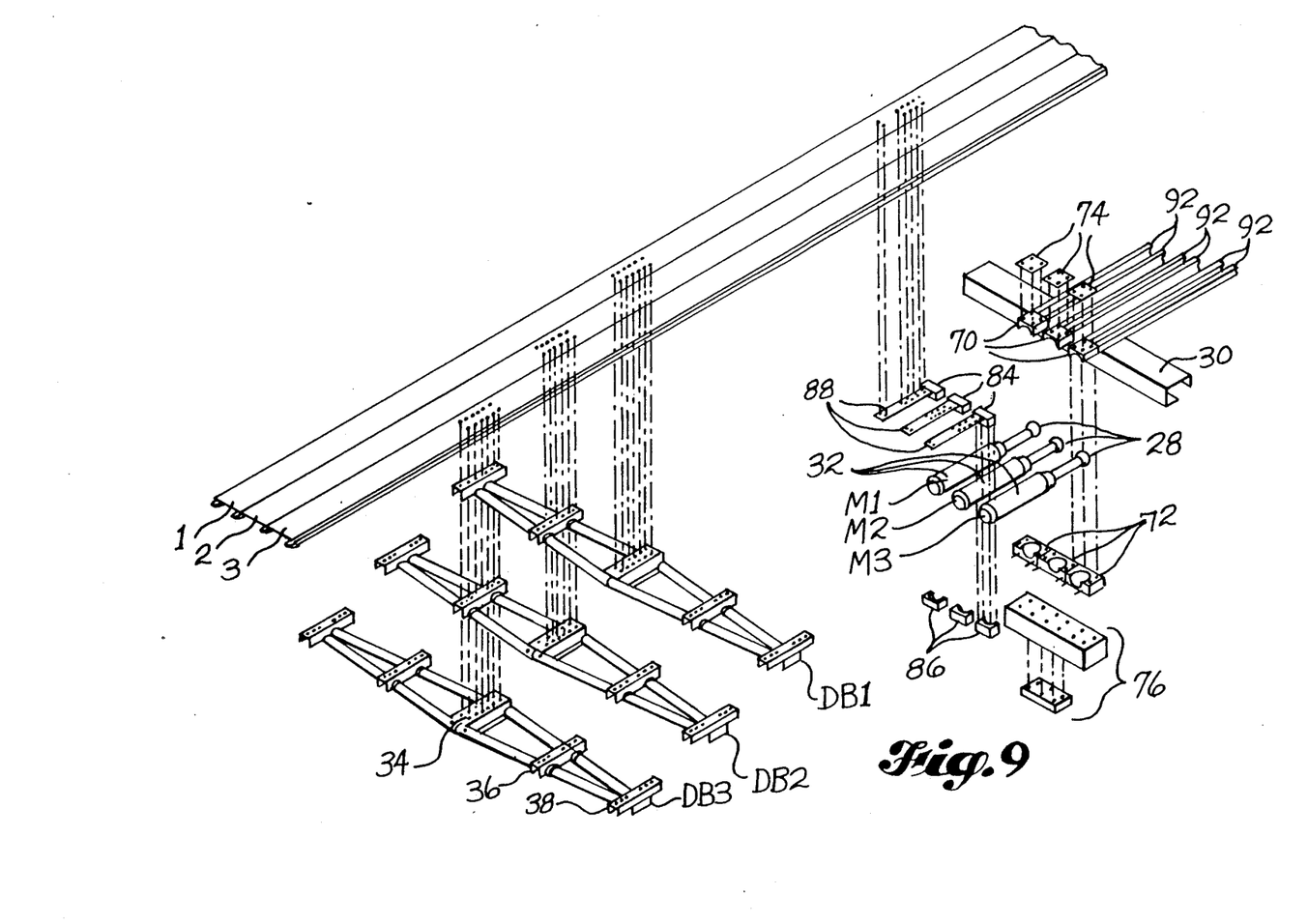
FIG. 9 is an exploded pictorial view of the components of the reciprocating floor conveyor, but showing only the three floor members to which the drive motors are directly connected.

Referring now also to FIG. 9, the present invention includes a drive system which directly drives floor slats of a reciprocating floor conveyor. As shown by the aforementioned U.S. Pat. Nos. 4,474,285; 4,748,893; 4,793,469; 4,817,783 and 5,000,647, in the past it has been the practice to attach the movable parts of the drive motors to transverse drive beams which in turn are attached to the floor members. The prior art systems utilize relatively heavy components and the thrust lines of the motors are spaced vertically below the floor members. It is beneficial to have the thrust lines of the motors as close to the center of gravity of the floor members as is possible. As will be explained in detail below, the system shown herein achieves both of these objectives. The components of the conveyor are relatively lightweight and the thrust lines of the motors are raised and located close to the center of gravity of the floor members.

The drive system of the present invention includes three sets of floor members indicated as 1, 2 and 3. A single group of floor members comprising one each of sets 1, 2 and 3 in a repeated common order is shown in FIG. 9. Three linear hydraulic drive motors M1, M2, M3 are positioned directly below corresponding floor members 1, 2, 3. A stationary portion 28 of each drive motor M1, M2, M3 is attached to a stationary frame member 30 which is positioned to be attached directly to the substructure 26. A movable portion 32 of each drive motor M1, M2, M3 is attached to a separate single floor member 1, 2, 3.

Figure 8A:
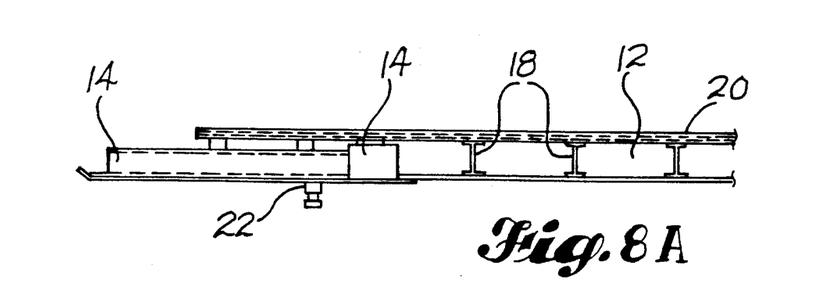
FIGS. 8A, 8B and 8C are sections of an elevational view of the conveyor frame, with FIG. 8C also showing a subframe below its section of the conveyor frame.
Figure 8B:
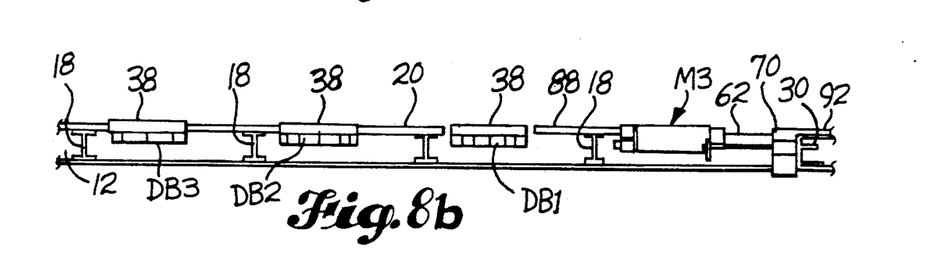
Figure 8C:
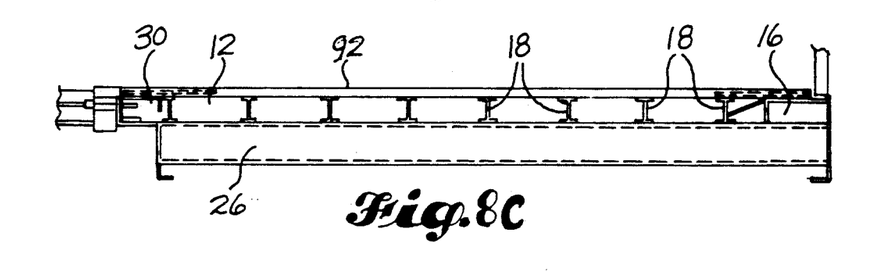

At a position longitudinally spaced from the drive motors M1, M2, M3, are separate transverse drive beams DB1, DB2, DB3 for each set of floor members. Thus, the three floor members 1, 2, 3 to which the motors M1, M2, M3 are directly connected serve as longitudinal drive beams. These longitudinal drive beams transmit the drive forces of the motors M1, M2, M3 to the transverse drive beams DB1, DB2, DB3. The drive beams DB1, DB2, DB3 then transmit the drive forces to the remaining floor members of each set. As in prior systems, all of the floor members 1, are connected to drive beam DB1. All of the floor members 2 are connected to drive beam DB2. All of the floor members 3 are connected to drive beam DB3. The difference is that there is no direct connection of the motors M1, M2, M3 to the transverse drive beams DB1, DB2, DB3. Rather, the connection is by way of the three floor members 1, 2, 3 which have been chosen to serve as longitudinal drive beams. The transverse drive beams DB1, DB2, DB3 can be spaced apart from each other, each between a transverse frame member 18 which is part of the conveyor frame, as shown in FIGS. 7B and 8B. Or, the three drive beams DB1, DB2, DB3 can be positioned relatively close together within a window in the frame, such as disclosed in the aforementioned U.S. Pat. No. 4,793,469, for example.

As shown in FIGS. 7B, 8B and 9, each transverse drive beam DB1, DB2, DB3 includes a plurality of connectors 34, 36, 38 which extend upwardly into the floor members 1, 2, 3. As in prior art systems, countersunk bolts are used to secure the floor members 1, 2, 3 to the connectors 34, 36, 38.

Figure 29:
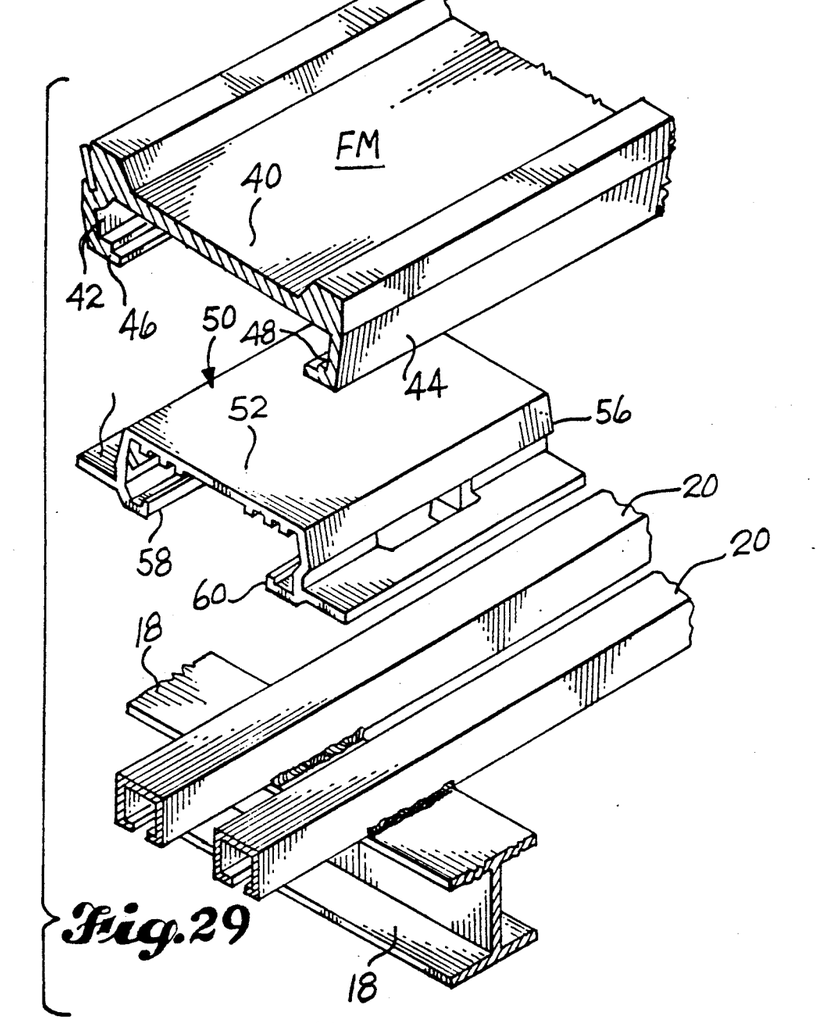
FIG. 29 is an exploded fragmentary pictorial view, showing guide beams for the floor members secured to transverse conveyor frame members, and a floor member bearing spaced above the guide beams, and the floor members spaced above the bearings.
Figure 30:
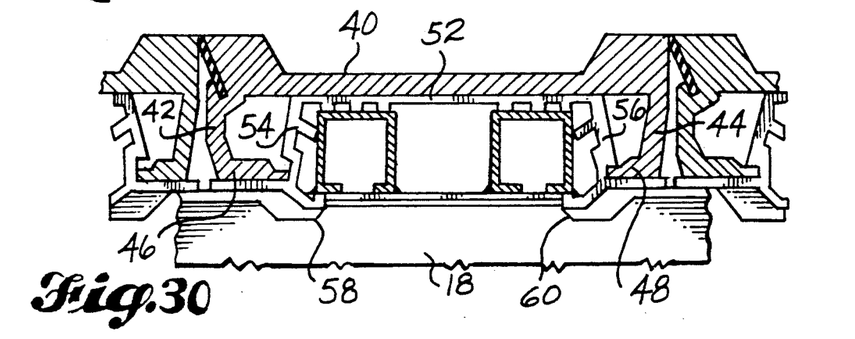
FIG. 30 is a transverse fragmentary sectional view showing the components of FIG. 29 in an assembled condition.

In preferred form, each guide beam 20 is a thin walled metal tube approximately one inch square. The guide beams 20 are welded or otherwise securely attached to the transverse beams 18. If desired to further reduce weight of the conveyor frame, the guide beams 20 can be in the form of a downwardly opening channel. This construction is shown in FIGS. 29 and 30.

U.S. Pat. No. 4,785,929 explains in detail the preferred bearing system for a reciprocating floor conveyor of the present invention. The entire disclosure of U.S. Pat. No. 4,785,929 is incorporated herein by this reference. Generally, the framework for each floor member FM includes a pair of guide beams 20. In preferred form, each floor member FM has a top wall 40 a pair of sidewalls 42, 44 extending downwardly from the top wall 40 and a pair of bottom flanges 46, 48 which project inwardly from the sidewall 42, 44 and define a space between them.

Bearing means 50, preferably constructed in accordance with the disclosure of U.S. Pat. No. 4,785,929, comprises a top 52 positioned over the guide beams 20. The bearing 50 includes side parts 54, 56 which are connected at their tops to the top 52 and depend downwardly therefrom into positions on the outer sides of the guide beams 20. The bearing 50 also includes a pair of lock flanges 58, 60 which extend inwardly from lower edges of side parts 54, 56. When the bearing 50 is installed on guide beams 20, look flanges 58, 60 are located below the outside lower edges of the guide beams 20 (as shown in FIG. 30, for example).

Such bearings 50 are spaced along the guide beams 20 at each cross beam 18. The design of the bearing 50 allows the floor members FM to be "snapped" into place. The installation involves setting the floor member FM on the bearing 50 with the top 52 of the bearing 50 positioned in the space between the two bottom flanges 46, 48 of the floor member FM. The floor member FM is then pushed downwardly. A downward force applied by the flanges 46, 48 of the floor member FM on the sidewalls 54, 56 of the bearing 50 will cause the sidewalls 54, 56 to swing inwardly to allow the floor member FM to move downwardly until the bottom flanges 46, 48 are locked in place by flanges of the bearing 50.

In preferred form, the linear hydraulic drive motors M1, M2, M3 are extensible length piston-cylinder units having the piston/rod component stationary with the frame and the cylinder barrel attached to move a floor member 1, 2, 3, or vice versa.

Figure 10:
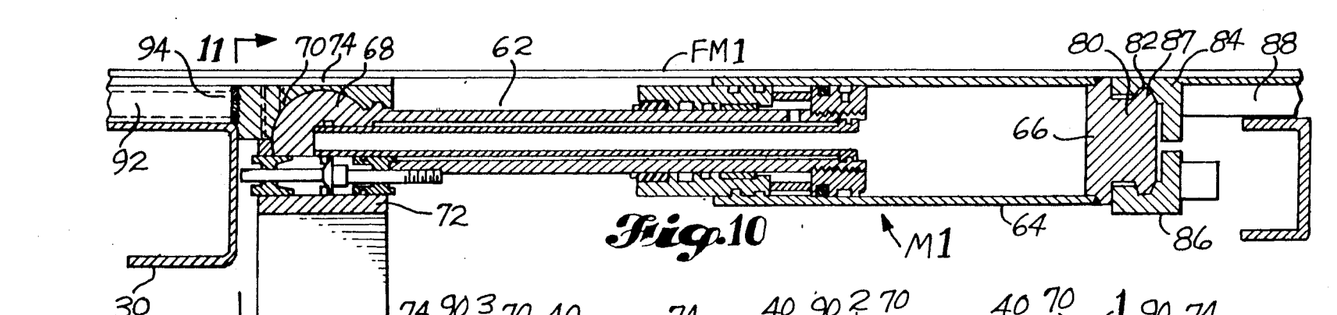
FIG. 10 is a fragmentary sectional view taken substantially along line 10—10 of FIG. 11.
Figure 31:
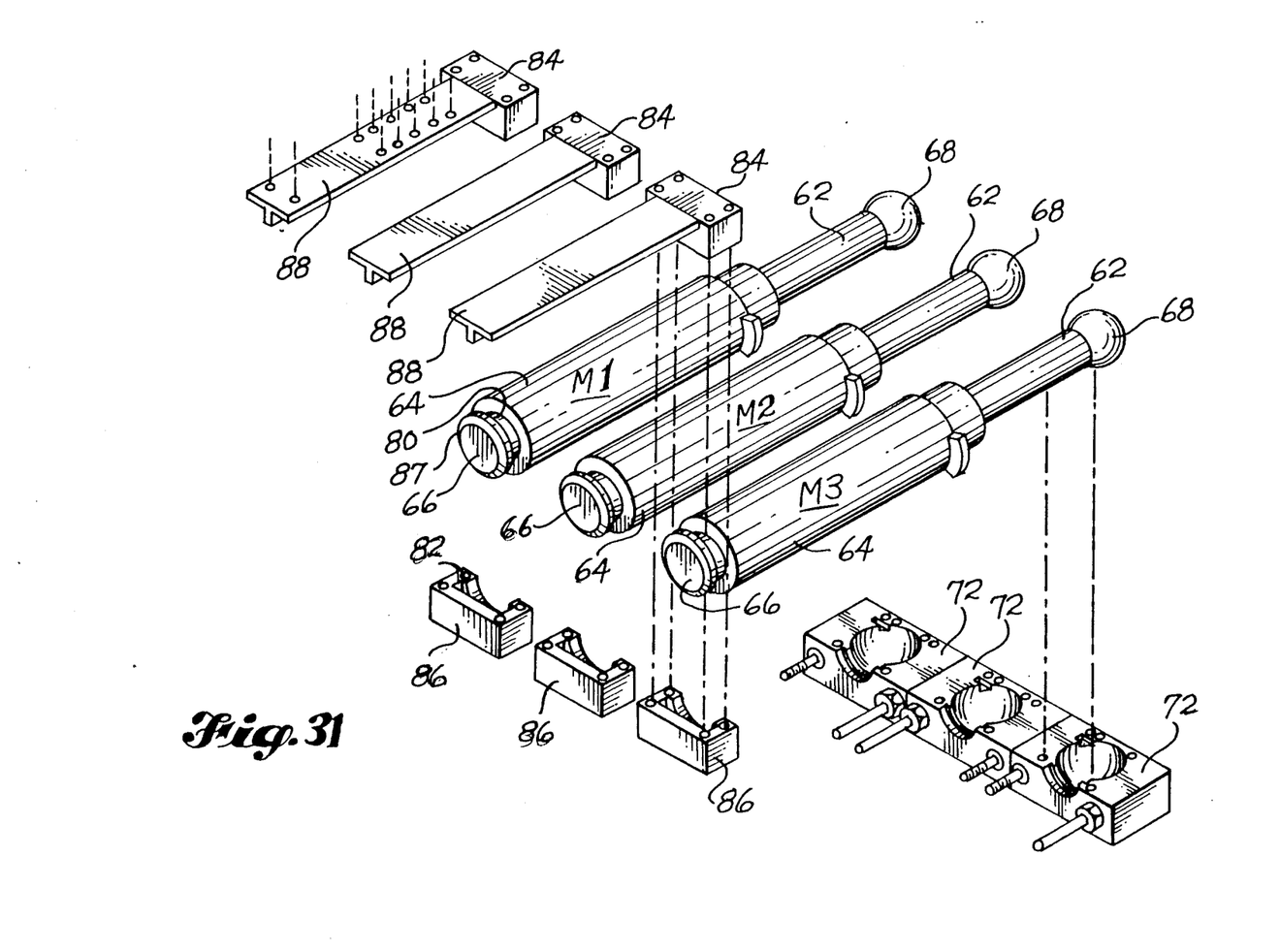
FIG. 31 is an exploded pictorial view showing linear hydraulic drive motors of the reciprocating floor conveyor and the separable connections between the motors and the floor members and between the motors and the frame.

Referring now specifically to FIGS. 9, 10 and 31, it can be seen that the stationary end of each drive motor M1, M2, M3 as illustrated, is a piston/rod component 62. The movable portion of each drive motor M1, M2, M3 is the cylinder barrel 64 and cylinder head 66. The rod portion 62 includes a ball end 68. The ball end 68 is held in a housing which is separable into upper and lower parts 70, 72. The housing parts 70, 72, when assembled, form a socket which securely holds the ball end 68 in place and prevents relative longitudinal movement. The ball and socket nature of the connection, however, allows very slight lateral movement as may be necessary to facilitate proper alignment of the motor M1, M2, M3 with the longitudinal direction of its floor member 1, 2, 3.

Figure 11:
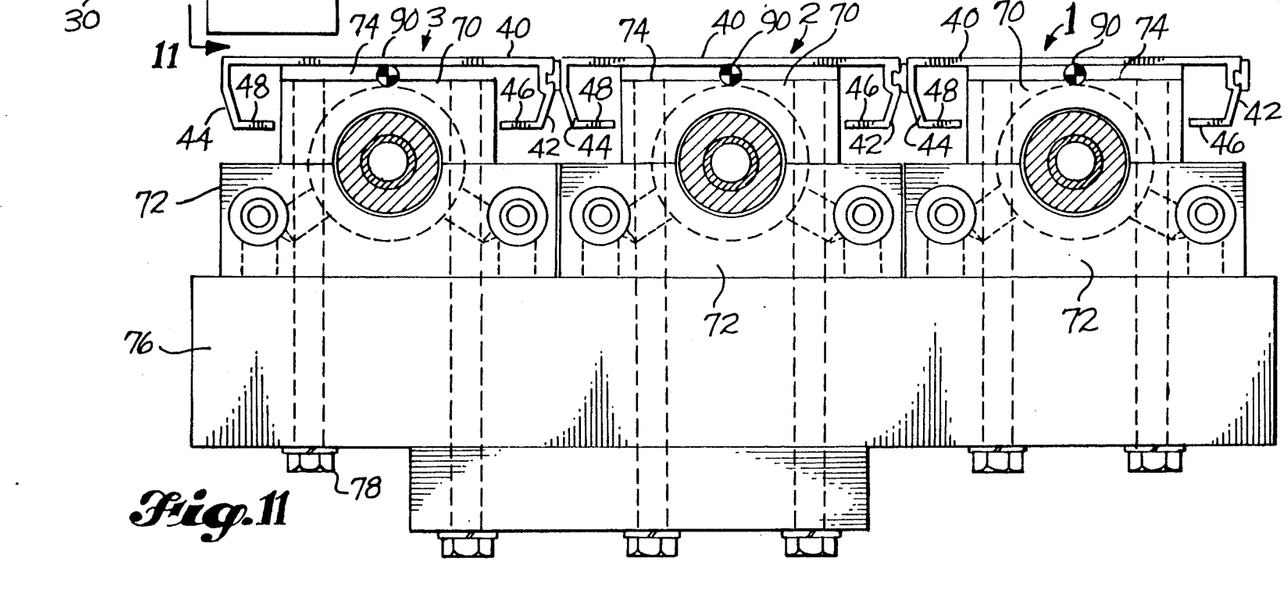
FIG. 11 is a transverse sectional view taken substantially along line 11—11 of FIG. 10.
Figures 12, 14, 15, 16:
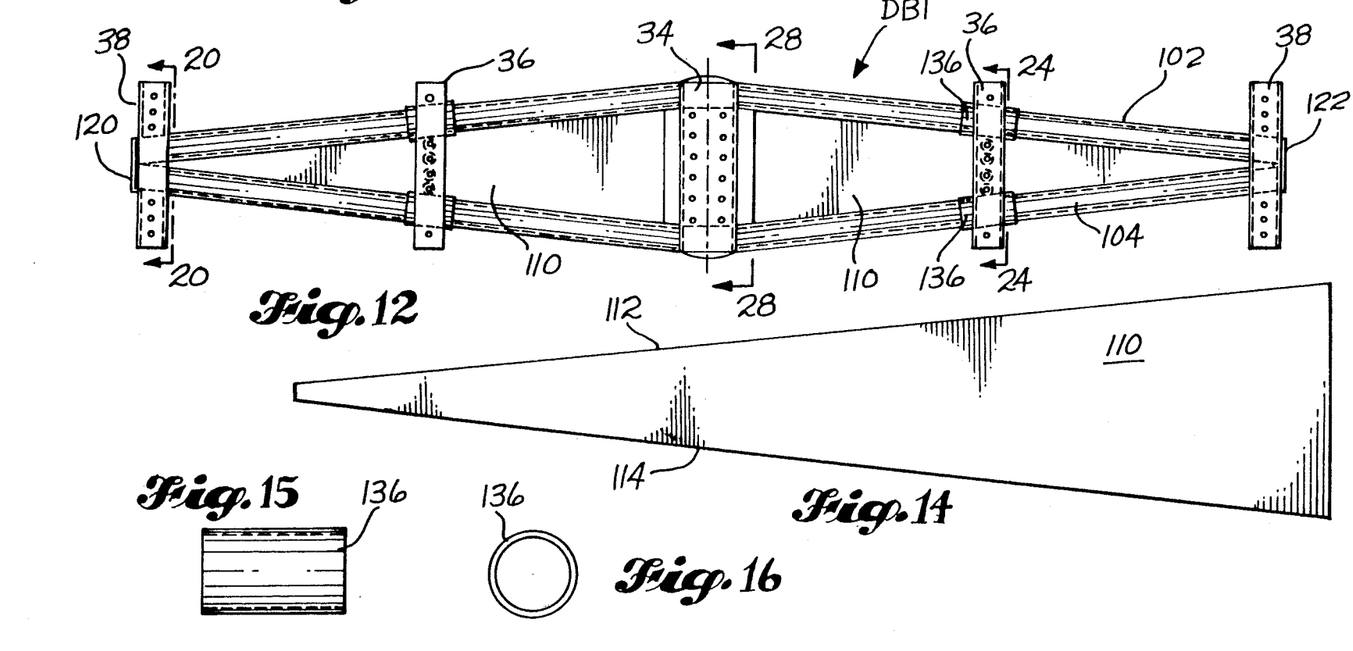
FIG. 12 is a top plan view of a transverse drive beam.
FIG. 14 is a top plan view of a shear plate which is a component of the transverse drive beam shown by FIG. 12.
FIG. 15 is a side elevational view of one of several connector tubes used to connect the floor member connectors to the tubular frame members of the transverse drive beam.
FIG. 16 is an end view of the connector tube shown by FIG. 15.

As shown by FIGS. 10 and 11, the upper housing parts 70 are positioned within the downwardly directed channel of floor members 1, 2, 3. Thin sheets of bearing material 74 are secured to upper housing parts 70. The bearing members 74 are constructed from a self-lubricated plastic of a type which has been used in the past for bearings used between floor members and support beams in reciprocating floor conveyors. See for example, my aforementioned U.S. Pat. No. 4,785,929, granted Nov. 22, 1988. The lower housing parts 72 include integral hydraulic fluid conduit connections having ports which mate with hydraulic conduit ports in the ball end 68 of the piston rod 62. The lower housing parts 72 also include valves which open and close the various fluid ports and otherwise control the flow of hydraulic fluid therethrough. Adjacent the lower housing part 72 is a manifold block 76 which comprises further fluid passageways and control means. The construction and operation of a fluid pressure control means for use with the present invention is described in detail in my related patent application titled "System of Linear Hydraulic Motor", filed on even date herewith. The details of such system are not described or shown herein, rather, the disclosure of the above-referenced application is incorporated herewith by reference.

The manifold block 76, lower housing part 72, and upper housing parts 70 are assembled together by a series of bolts 78 (FIG. 11) which fit through aligned bolt holes in each member and screw into a threaded hole in an opposite member.

The connection between the floor members 1, 2, 3 and the movable position of drive motor M1, M2, M3 is at the head portion 66 of the cylinder 64.

The head portion 66 of each cylinder 64 includes an extended pin or nose portion 80 having an annular ridge 82. Upper and lower housing parts 84, 86 are secured together by a series of bolts which fit through aligned bolts holes as pictured in FIG. 31. The bolts each extend through a hole in one member and screw into a threaded hole in the second member. When assembled together, the upper and lower housing parts 84, 86 form a socket which receives the extended nose 80 or pin of the cylinder head portion 66. The socket formed by the upper and lower housing parts 84, 86 includes an annular groove 87 which snugly receives the annular ridge 82 of the nose or pin portion 80. It is not necessary, however, that the cylinder head 66 connection with the housing 84, 86 include fluid passageways or mating ports.

The ball and socket or pin and socket type connection at opposite ends of the linear hydraulic drive motors M1, M2, M3 are similar in function in that each connection secures against longitudinal movement at the relative connections while allowing very limited lateral movement therein. For disconnection of each end of the drive motor M1, M2, M3, upper and lower housing parts 70, 72 or 84, 86 are separated to allow lateral disconnection of the ball or pin from the socket.

Extending axially from the upper housing part 84 are connectors 88. These connectors 88 are formed integral with or are firmly connected (e.g. welded) to the upper housing parts 84 so that they are capable of transmitting forces between the motors M1, M2, M3 and the floor members 1, 2, 3. Each connector 88 is positioned up in the open channel of its respective floor member 1, 2, 3 and is secured to the floor member by a plurality of bolts. The bolts extend through countersunk holes in the floor members and screw into threaded holes in the connectors 88. Or, they may extend through openings in the floor members 1, 2, 3 and the connectors 88 and receive nuts at their lower ends. In order to maximize strength and minimize weight, the connectors 88 may have a substantially T-shaped cross section, as illustrated in FIG. 31.

As will be apparent, and as is illustrated in FIGS. 10 and 11, the use of the connectors 88 at the of the motors M1, M2, M3, and the use of the upper housing parts 70 at the ball ends 68 of the piston rod 62, essentially places the motors M1, M2, M3 upwardly into the floor members 1, 2, 3 (FIG. 11). It is also preferred that the diameter of the motor M1, M2, M3 and the channel of the floor members 1, 2, 3 be sized to permit such construction. This places the longitudinal axis or thrust lines of the motors M1, M2, M3 close to the longitudinal center of gravity (illustrated approximately at 90) of the floor members 1, 2, 3. This is further facilitated by disjunctive of the transverse drive beams DB1, DB2, DB3 from the drive motors M1, M2, M3.

Figure 32:
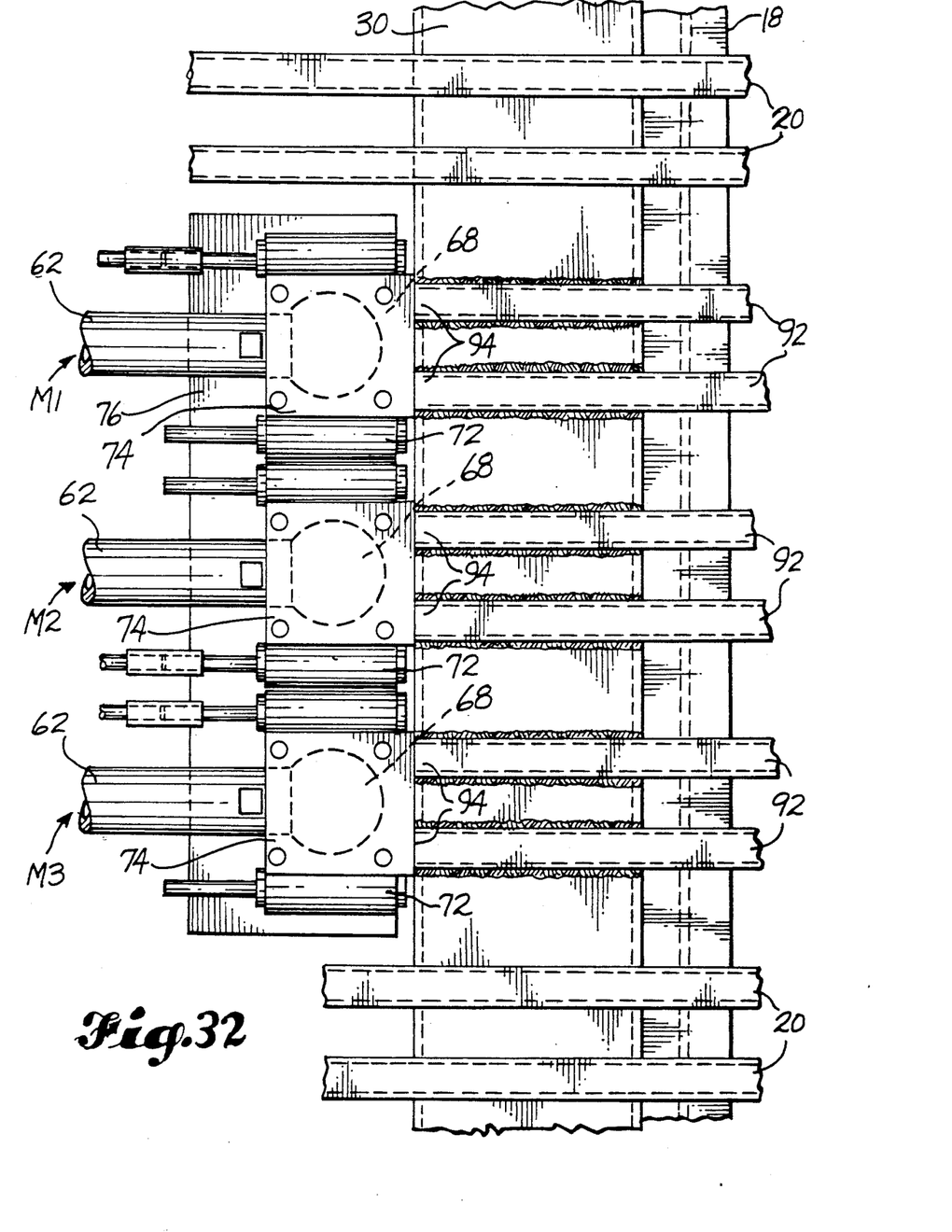
FIG. 32 is a detailed top plan view showing the connection between the stationary portion of the linear hydraulic drive motors and the conveyor frame.

Referring now specifically to FIGS. 7C, 9 and 32, therein can be seen three pairs of specialized guide beams 92 positioned longitudinally directly in line with the longitudinal axis of each drive motor M1, M2, M3. End portions 94 of each guide beam 92 directly abut upper housing piece 70 of the stationary end of each drive motor M1, M2, M3. This can also be seen in FIG. 10. In preferred form these ends 94 are directly and firmly attached (e.g. by welding) to the upper housing part 70 and stationary frame member 30 which, as described above, is secured directly to the substructure 26. Each guide beam 92 is also secured to the transverse members 18 rearward of the drive motors M1, M2, M3 and secured directly to the rear transverse beam 16. Each of these members are, in turn, secured directly to the substructure 26. As can be seen especially in FIGS. 7C and 8C, this construction causes the longitudinal forces from the drive motors M1, M2, M3 to be transferred as directly as possible to the substructure 26 of the trailer and isolates these forces from all other areas of the conveyor frame 10 while allowing the drive motors M1, M2, M3 to be located close to the floor members. It is preferred that the guide beams 92 have the same exterior dimensions (e.g. one inch by one inch) as the other previously described guide beams 20. However, it is preferred that the guide beams 92 be of a heavier-walled material in order to best carry longitudinal loads placed thereon by the stationary ends of the drive motors M1, M2, M3.

Referring to FIG. 9, it can be seen that the transverse drive beams DB1, DB2, DB3 are longitudinally spaced from the drive motors M1, M2, M3. The transverse drive beams DB1, DB2, DB3 can be located at virtually any longitudinal position along the conveyor frame.

Referring now to FIGS. 7B and 8B, each transverse drive beam DB1, DB2, DB3 is positioned in a separate space 96, 98, 100 between transverse supports 18. This space 96, 98, 100 must be sufficiently wide to allow the drive beams DB1, DB2, DB3 longitudinal movement equivalent to the stroke of the drive motors M1, M2, M3 (for example, six inches).

Figure 13:
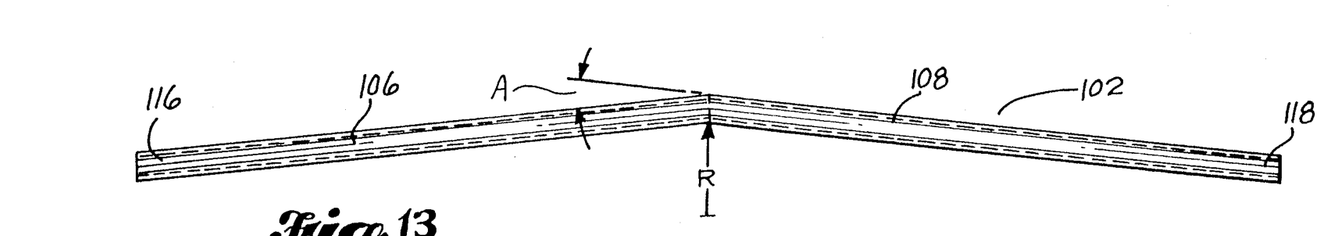
FIG. 13 is a plan view of a tubular side frame member which is a component of the transverse drive beam shown in FIG. 12.
Figure 17:
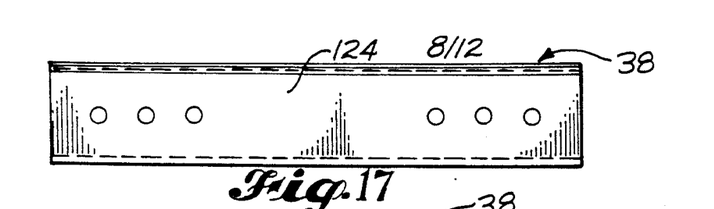
FIG. 17 is a top plan view of an end floor member connector.
Figure 18:
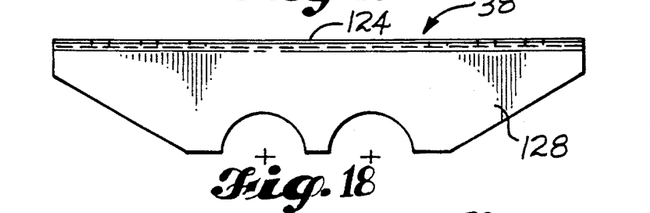
FIG. 18 is a side elevational view of the connector member shown by FIG. 17.
Figure 19:
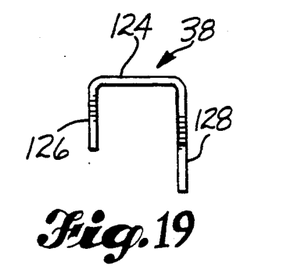
FIG. 19 is an end elevational view of the connector member shown by FIGS. 17 and 18.
Figure 20:
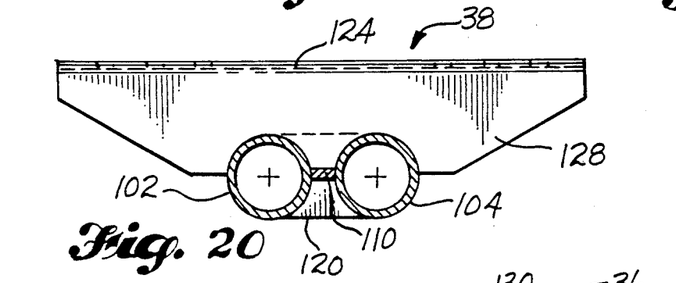
FIG. 20 is an end elevational view of one end of the transverse drive beam, showing the connector member of FIGS. 17-19 connected to the tubular side frame members of the beam.
Figures 21, 22, 23, 24:
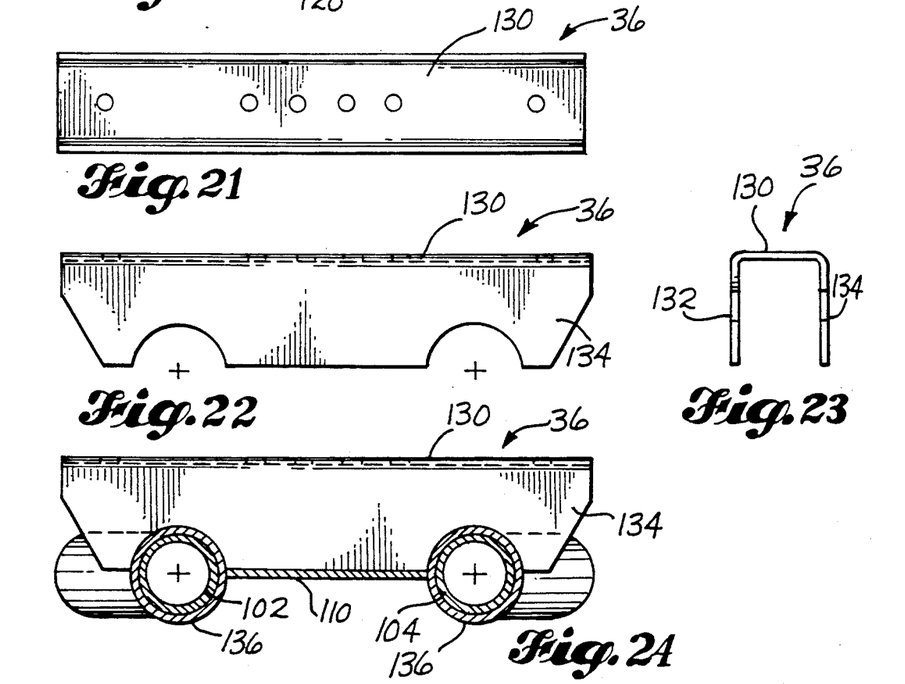
FIG. 21 is a top plan view of an intermediate floor member connector.
FIG. 22 is a side elevational view of the connector shown by FIG. 21.
FIG. 23 is an end view of the connector shown by FIGS. 21 and 22.
FIG. 24 is a transverse sectional view taken substantially along line 24—24 of FIG. 12, such view showing the intermediate floor member connector secured to the tubular side frame members of the beam.
Figure 25:
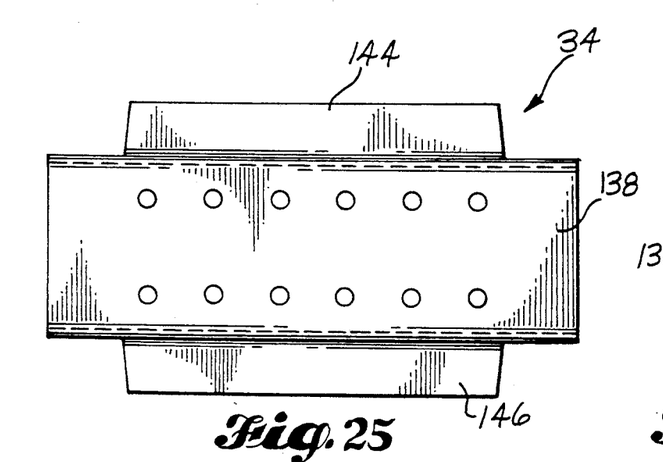
FIG. 25 is a top plan view of a central floor member connector.
Figure 26:
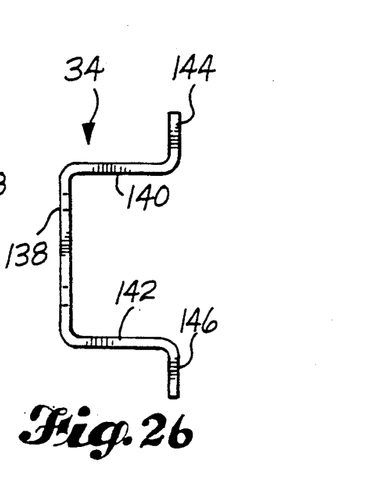
FIG. 26 is an end view of the connector shown by FIG. 25.
Figure 27:
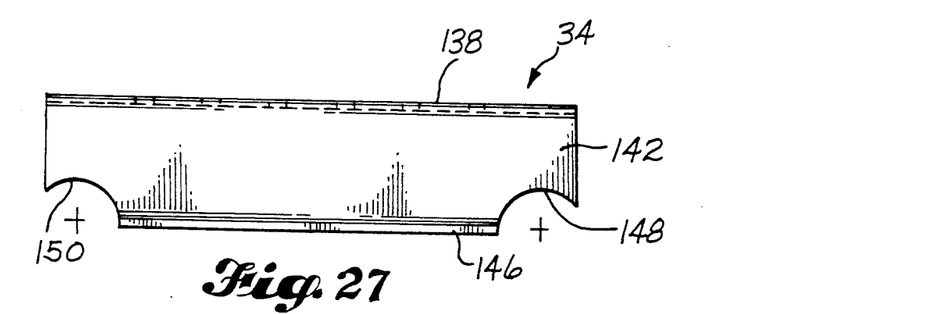
FIG. 27 is a side elevational view of the connector shown by FIGS. 25, 26.
Figure 28:
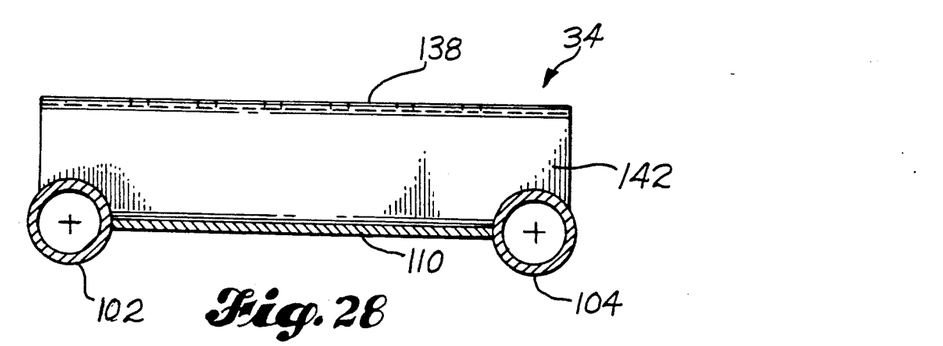
FIG. 28 is a cross sectional view taken substantially along line 28—28 of FIG. 12, showing the center floor member connected to the tubular side frame members of the beam.

As illustrated, there are five floor members in each set, making five groups of three floor members for a total of fifteen floor members in the entire system. Because the drive motors M1, M2, M3 are laterally aligned and the transverse drive beams DB1, DB2, DB3 are longitudinally staggered, the length of the floor members 1, 2, 3 which act as longitudinal drive beams will vary: floor member being 1 being the shortest, floor member 2 being intermediate, and floor member 3 being the longest. Referring now also to FIGS. 13-28, each transverse drive beam DB1, DB2, DB3 is identical in construction. For purposes of illustration, only one drive beam (DB1) will be described in detail. The drive beam DB1 comprises a pair of elongated frame members 102, 104. As shown in FIG. 13, each frame member 102, 104 is bent at a central location around a radius R to create two arm portions 106, 108 at an angle A relative to one another. This angle may be, for example, twelve degrees. In preferred form, the frame members 102, 104 are tubular and round in cross section to provide maximum strength and minimum weight. The frame members 102, 104 are connected together by a pair of web members or shear plates 110. The shear plate 110 is firmly attached (e.g. welded) at opposite edges 112, 114 along the length of each frame member 102, 104. Opposite ends 116, 118 are brought together and fastened with end plates 120, 122 such that the frame members 102, 104 and shear plates 110 form a substantially diamond-shape planar beam.

Referring now to FIGS. 17-20, end connector members 38 are attached at end locations to the upper side of the drive beam DB1. In preferred form, the end connector 38 is formed of a single piece having a top 124 and inner and outer downwardly projecting sides 126, 128. The top panel is supplied with a series of openings through which bolt and nut type fasteners are used to attach a floor member to the end connector 38. Each end connector 38 is directly firmly attached (e.g. welded) to the frame members 102, 104.

Referring to FIGS. 15, 16 and 21-24, therein is shown the preferred form of an intermediate connector member 36. Intermediate connector 36 includes a top panel 130 and first and second downwardly-extending sides 132, 134. The top panel is drilled, as described above, for connection to a floor member. Sleeve members 136 are placed on the frame members 102, 104 at the location of the intermediate connector 36. The sleeve members 136 are sized to fit snugly around the frame members 102, 104 but are not otherwise attached thereto. Instead, the sleeve members 136 are firmly attached (e.g. welded) to the shear plate 110. The intermediate connector 36 is in turn connected firmly (e.g. welded) directly to the sleeve members 136 and the shear plate 110. Such a connection allows the frame members 102, 104 to carry a moment load at this location and will accommodate slight torsional loads which may be carried by the drive beam.

Centrally located on each drive beam is a center connector 34. Referring to FIGS. 25-28, the center connector 34 includes a top panel 138, a pair of downwardly extending sides 140, 142 and a pair of outwardly extending flange portions 144, 146. As described above, the top panel 138 is provided with holes through which connection is made with a floor member. Although the center connector 34 is provided with out-outs 148, 150 which closely fit against the frame members 102, 104, it is not directly attached thereto. Instead, the flange portions 144, 146 of the center connector 34 are connected firmly (e.g. welded) to the shear panels 110. As previously described, this allows the frame members 102, 104 to carry a moment load at this location and to accommodate torsional loads placed on the drive beam. Also, the frame members 102, 104 are not weakened by welding or by fastener attachments, thereby allowing the frame members 102, 104 to be constructed of minimum weight material.

The illustrated and above-described embodiment represents the best and preferred mode contemplated by the inventor at the present time. It is to be understood that many variations in size, shape and construction can be made without departing from the spirit and scope of the present invention. Some of the features of the preferred embodiment may be utilized without other features. Therefore, it is to be understood that the presently-described and illustrated embodiment is nonlimitive and is for illustration only. Instead, my patent protection is to be limited only by the following claim or claims interpreted according to accepted doctrines of claim interpretation, including the doctrine of equivalents.

What is claimed is:

1. A reciprocating floor conveyor characterized by a plurality of elongated floor members which are divided into sets and groups, wherein each set comprises at least two floor members in a common order, each group comprises one member from each set, and the groups extend side by side across the conveyor, and wherein the floor members are supported on a conveyor frame, each for longitudinal back and forth movement, and a drive mechanism for the floor members, comprising:

a separate linear hydraulic drive motor for each set of floor members, each comprising a stationary portion and a movable portion, said stationary portion being connected to a stationary frame member, and said movable portion being connected to a floor member of its set; and a plurality of transverse drive beams, one for each set of floor members, said drive beams being spaced longitudinally of the conveyor from the motors, with all of the floor members of each set being connected to the drive beam for the set, whereby operation of each said drive motor will exert a drive force onto a particular floor member to which the drive motor is connected, and such floor member will function as a longitudinal drive beam and will transmit the drive force to the transverse drive beam, and each transverse drive beam will in turn transmit the drive forces to other floor members of its set.

2. The reciprocating floor conveyor of claim 1, wherein each of said elongated floor members are substantially in the form of a channel having a top portion and downwardly-extending side portions defining a space below said top portion and between said side portions.

3. The reciprocating floor conveyor of claim 1 wherein each of said linear hydraulic drive motors is positioned adjacent to and below a floor member of its set.

4. The reciprocating floor conveyor of claim 3, wherein each of said linear hydraulic drive motors is positioned adjacent to and below a floor member of its set, and said linear hydraulic drive motor being positioned at least partially within said space.

5. The reciprocating floor conveyor of claim 4, wherein each said elongated floor member includes a longitudinal center of gravity, each of said linear hydraulic drive motors having a longitudinal axis, and each of said drive motors being positioned such that its longitudinal axis is closely adjacent the longitudinal center of gravity of the floor member to which it is connected.

6. The reciprocating floor conveyor of claim 1, wherein the connection of said stationary portion to said stationary frame member includes a ball and socket.

7. The reciprocating floor conveyor of claim 1, wherein said connection between said stationary portion and said stationary frame member includes integral hydraulic fluid conduit connections.

8. The reciprocating floor conveyor of claim 6, wherein said connection between said stationary portion and said stationary frame member includes integral hydraulic fluid conduit connections, said ball and socket including mating ports.

9. The reciprocating floor conveyor of claim 6, wherein said socket is connected to said stationary frame member and includes a separable portion which when in place retains said ball within said socket and when separated allows lateral removal of said ball from said socket.

10. The reciprocating floor conveyor of claim 1, wherein said connection between said stationary portion and said stationary frame member includes a bearing member on which a floor member is carried.

11. The reciprocating floor conveyor of claim 1, wherein said stationary frame member includes longitudinal load bearing guide beams positioned in line with each of said linear hydraulic drive motors and extending to an end member of said conveyor frame.

12. The reciprocating floor conveyor of claim 1, wherein said connection between said movable portion and said floor member includes a pin and socket connection, said socket including an annular groove and said pin including an associated annular ridge.

13. The reciprocating floor conveyor of claim 12, wherein said socket includes a separable portion which when in place restrains said pin in said socket and which when separated allows lateral removal of said pin from said socket.

14. The reciprocating floor conveyor of claim 12, wherein said connection between said movable portion and said floor member includes a longitudinally extended attachment portion connected to said floor member and extending from said pin and socket connection.

15. The reciprocating floor conveyor of claim 1, wherein each of said transverse drive beams includes a pair of spaced apart laterally extending frame portions interconnected by a web portion.

* * * * *

UNITED STATES PATENT AND TRADEMARK OFFICE
CERTIFICATE OF CORRECTION

PATENT NO. : 5,165,524
DATED : November 24, 1992
INVENTOR(S) : Raymond K. Foster It is certified that error appears in the above-identified patent and that said Letters Patent is hereby corrected as shown below:

Column 6, line 63, "look" should be -- lock --.

Column 8, line 49, "disjunctive" should be -- disjuncture --.

Column 10, line 22, "out-outs" should be -- cut-outs --.

Signed and Sealed this

Eleventh Day of January, 1994

BRUCE LEHMAN

*Attest:*

*Attesting Officer*    *Commissioner of Patents and Trademarks*